(12) United States Patent  (10) Patent No.: US 7,657,915 B1
Bradley et al. (45) Date of Patent: Feb. 2, 2010

(54) SYSTEM FOR COMBINING AND SPLITTING SIGNAL IN A CABLE MODEM TERMINAL SYSTEM

(75) Inventors: Paul Thomas Bradley, Danville, CA (US); Nicos Achilleoudis, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1209 days.

(21) Appl. No.: 10/871,884

(22) Filed: Jun. 18, 2004

(51) Int. Cl.
*H04N 7/173* (2006.01)
*H04J 3/04* (2006.01)
*H04J 3/02* (2006.01)

(52) U.S. Cl. ............... 725/111; 725/105; 370/535
(58) Field of Classification Search ............. 725/111, 725/105; 370/535, 542
See application file for complete search history.

(56) References Cited

U.S. PATENT DOCUMENTS 6,137,793 A * 10/2000 Gorman et al. ............. 370/360
6,351,582 B1 * 2/2002 Dyke et al. ................. 385/24
6,785,558 B1 * 8/2004 Stratford et al. ............ 455/561
7,099,340 B2 * 8/2006 Liva et al. .................. 370/401
7,142,620 B2 * 11/2006 Buda ......................... 375/347
7,577,170 B2 * 8/2009 Curet et al. ................ 370/535

FOREIGN PATENT DOCUMENTS

JP    2005-086274    *  3/2005
KR    2001-0001312   *  1/2001

OTHER PUBLICATIONS

Ashok Bindra, Upstream Cable Modem Line Driver Targets Tight DOCSIS Specifications, Aug. 21, 2000, Penton Media, Inc.*

* cited by examiner

*Primary Examiner*—Hoang-Vu A Nguyen-Ba
(74) *Attorney, Agent, or Firm*—Patterson & Sheridan, LLP

(57) ABSTRACT

A system and method for splitting and combining signal in a Cable Modem Terminal Station (CMTS). This system uses a hierarchal approach to connect RF modules to PHY modules. A first splitter and combiner connects each N input in a module to each of N outputs. Each of Nth output is then connected to a Nth second splitter/combiner which in turn connects each input to each output.

9 Claims, 7 Drawing Sheets

SYSTEM FOR COMBINING AND SPLITTING SIGNAL IN A CABLE MODEM TERMINAL SYSTEM

FIELD OF THE INVENTION

This invention relates to a Cable Modem Terminal System (CMTS). More particularly, this invention relates to splitting and combining signals in the CMTS. Still more particularly, this invention relates to circuitry in the CMTS that allows software to be used to split and combine the signals.

PRIOR ART

It is common for cable television operators to provide Internet service to subscribers. This requires the cable operators to split signals at various terminals as signals are transmitted downstream from the provider to the user and to combine signals from various users onto a single path as the signals are being transmitted upstream from the users to the cable provider. A common point for doing the combining and the splitting is in a Cable Modem Terminal System (CMTS).

The CMTS is a box or system in the transmission stream that receives and sends signals over one path to a Cable operator headend and transmits over many paths to subscriber end systems. It is a problem in the CMTS that the splitters and combiners are external to the CMTS system. The splitters and combiners being external means that the circuitry that does the combining and splitting are separate components from the systems that perform the transmission of the signals. Thus, the splitters and combiners take up valuable real estate in the housing of the CMTS system.

As the cable providers provide more services to end users, real estate in the housing is at a premium as more circuitry will be needed in the housing to provide these services. Thus, those skilled in the art desire to minimize the amount of circuitry needed to combine and split signals.

SUMMARY OF THE INVENTION

The above and other problems are solved and an advance in the art is made with the system for combining and splitting signals in a CMTS in accordance with this invention. In accordance with this invention, combiners and splitters are performed by software inside the CMTS. One advantage of this is to free up rack space in the CMTS.

BRIEF DESCRIPTION OF THE DRAWINGS

The above and other features and advantages of this invention are described in the following detailed description and are shown in the following drawings.

DETAILED DESCRIPTION

Figure 1:
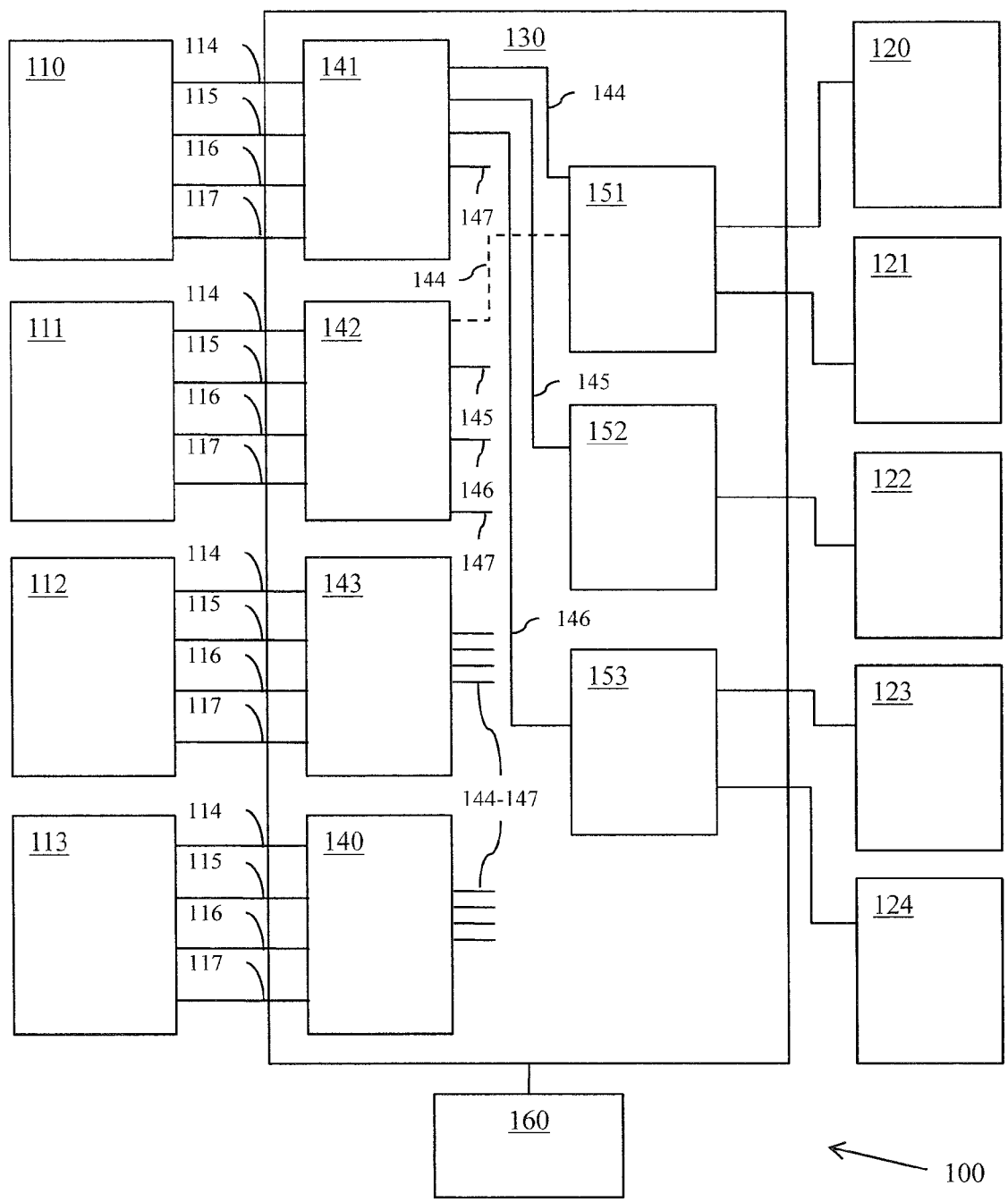
FIG. 1 illustrating a Cable Modem Terminal System in accordance with this invention.

FIG. 1 illustrates a block diagram of circuitry inside a CMTS 100. CMTS 100 includes N Radio Frequency (RF) input modules 110-112, M Physical interface (PHY) modules 120-124, and splitter combiner 130. N RF modules 110-112 include circuitry that may receive or transmit RF signals and convert between RF signals and digital data. For example each of RF modules 110-112 may be uBR10k line cards commonly available in the art. Each RF module 110-112 generates or receives digital data over X data paths 114-117. One skilled in the art will recognize that although 4 RF modules 110-113 are shown, any number of RF modules may be used. In a preferred exemplary embodiment, 24 RF modules 110-113 are included CMTS 100 and each module includes 7 data paths.

M PHY modules 120-124 provide a physical interface connecting CMTS 100 to a MAC layer (NOT shown). The precise function of the PHY modules is omitted as functioning of the PHY modules is not essential for an understanding of this invention. Preferably, M is equal to N*X. Thus, the number of PHY modules is the number of RF modules multiplied by the numbers of data paths from each module. For example, a preferred exemplary embodiment includes 168 PHY modules.

Splitter combiner circuitry 130 connects the data paths 114-117 from RF modules 110-113 to PHY modules 120-124. Splitter/combiner circuitry can combine multiple data paths and connect them to a single PHY module or may connect a data path to multiple PHY modules. If splitter/combiner circuitry 130 provided a trace from every data path to every PHY module, the number of traces would be astronomical and impractical. For example 15,360 traces would be required in the exemplary embodiment. Thus, a hierarchal approach is used in accordance with the present invention. Splitter/combiner circuit 130 may be used to split and combine data in either the upstream or downstream direction depending upon the configuration of the circuit.

Splitter/combiner 130 includes a first set of cross connect circuitry 141-143. The N number of cross connect circuitry 141-143 with each one of the first set cross connect circuitry 141-143 have X ports connected to X data paths 114-117 of a corresponding RF module 110-112. Each first set of cross connect circuitry 141-143 connects each of X data paths 114-117 to each Y intermediate data path 144-147 in splitter/combiner circuitry 130. Preferably, there are an equal number of data paths and intermediate data paths thus, X is equal to Y. For example in the preferred embodiment each RF module provides 8 data paths and thus there are 8 intermediate data paths from each first set of cross connect circuitries.

Each data path 114-117 may be connected to any data path 144-147. Each data path 114-117 may also be connected to more than one intermediate data path 144-147 to split the signals on the data path. Alternatively, more than one data path may be connected to one intermediate path 144-147 to combine signals. One skilled in the art will recognize that there may be a maximum number of signals that may be combined on one intermediate data path. For example, only four data paths may be combined on any intermediate data path in the preferred exemplary embodiment.

Figure 4:
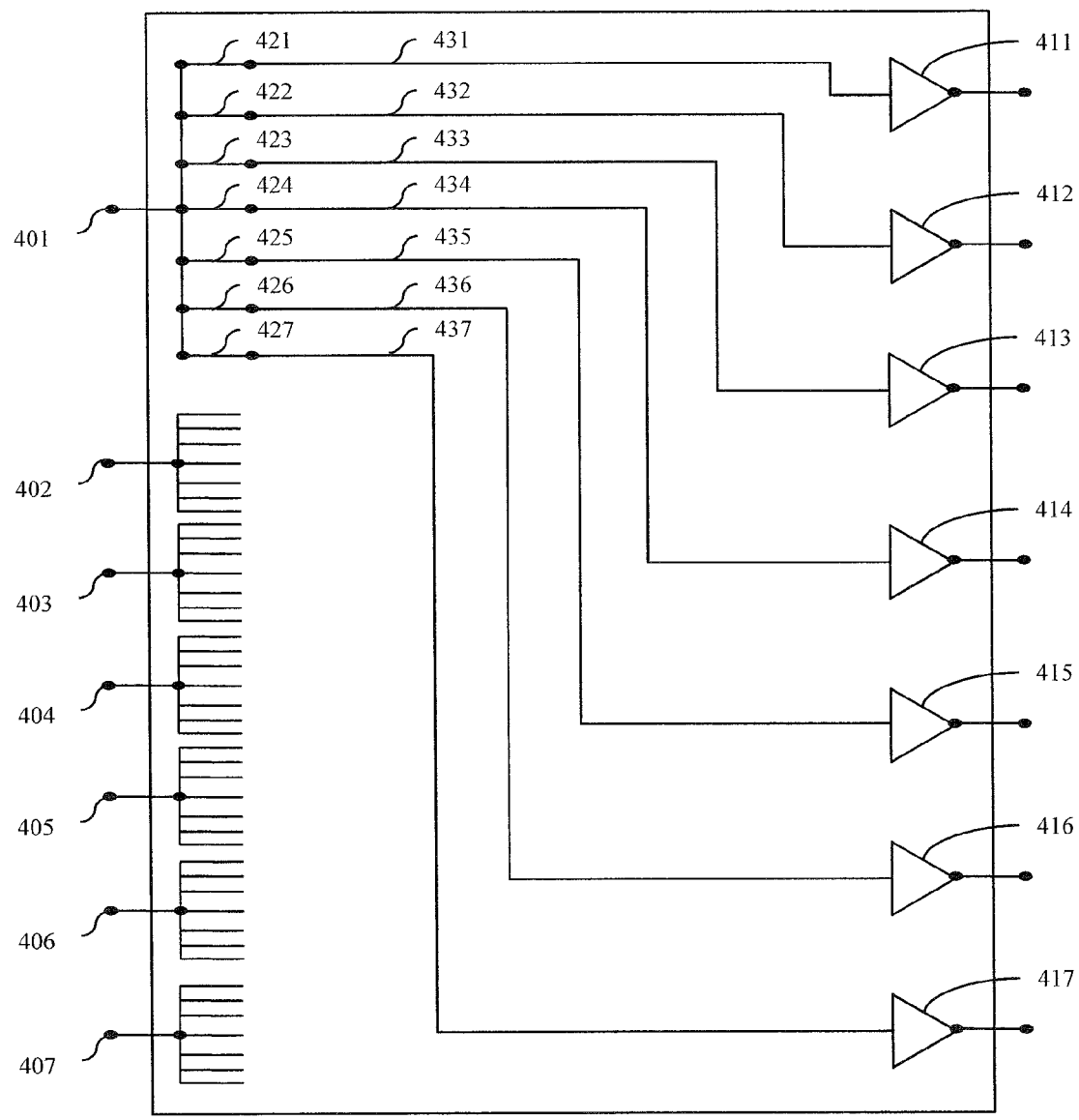
FIG. 4 illustrating an exemplary embodiment of first cross connect circuitry in accordance with this invention.

Although shown as a separate component, one skilled in the art will recognize that portions of splitter/combiner circuitry 130 may be incorporated into other components. For example each of first set of cross connect circuitry may be incorporated in the RF module 110-113 associated with the cross connect circuitry. A detailed description of the first set of cross connect circuitry is shown in FIG. 4 and described below.

Splitter/combiner circuitry also includes a second set of cross connect circuits 151-153. Each of second set of cross connect circuits 151-153 connects X number of intermediate paths 144-147, one from each of first set of cross connect circuits 140-143. The Xth one of the second set of cross connects circuits connects to the Xth intermediate path from each of the first set of cross connect circuits. For example, the first of the second set of cross connects circuits 151 connects to each of the first intermediate paths 144 from each the first set of cross connect circuits and the second of the second set of cross connects circuits 152 connects to the second intermediate path 145 of each of first set of cross connect circuits 141.

Each of the second set of cross connect circuits 150-153 also connect to Z number of PHY modules. Preferably, the number of PHY modules connected to each of the second set of cross connect circuits is equal to the number of RF modules 110-113. For example, there are 24 RF modules in CMTS 100 in the preferred exemplary embodiment, thus each of second set of cross connects circuits is connected to 24 PHY modules.

Figure 5:
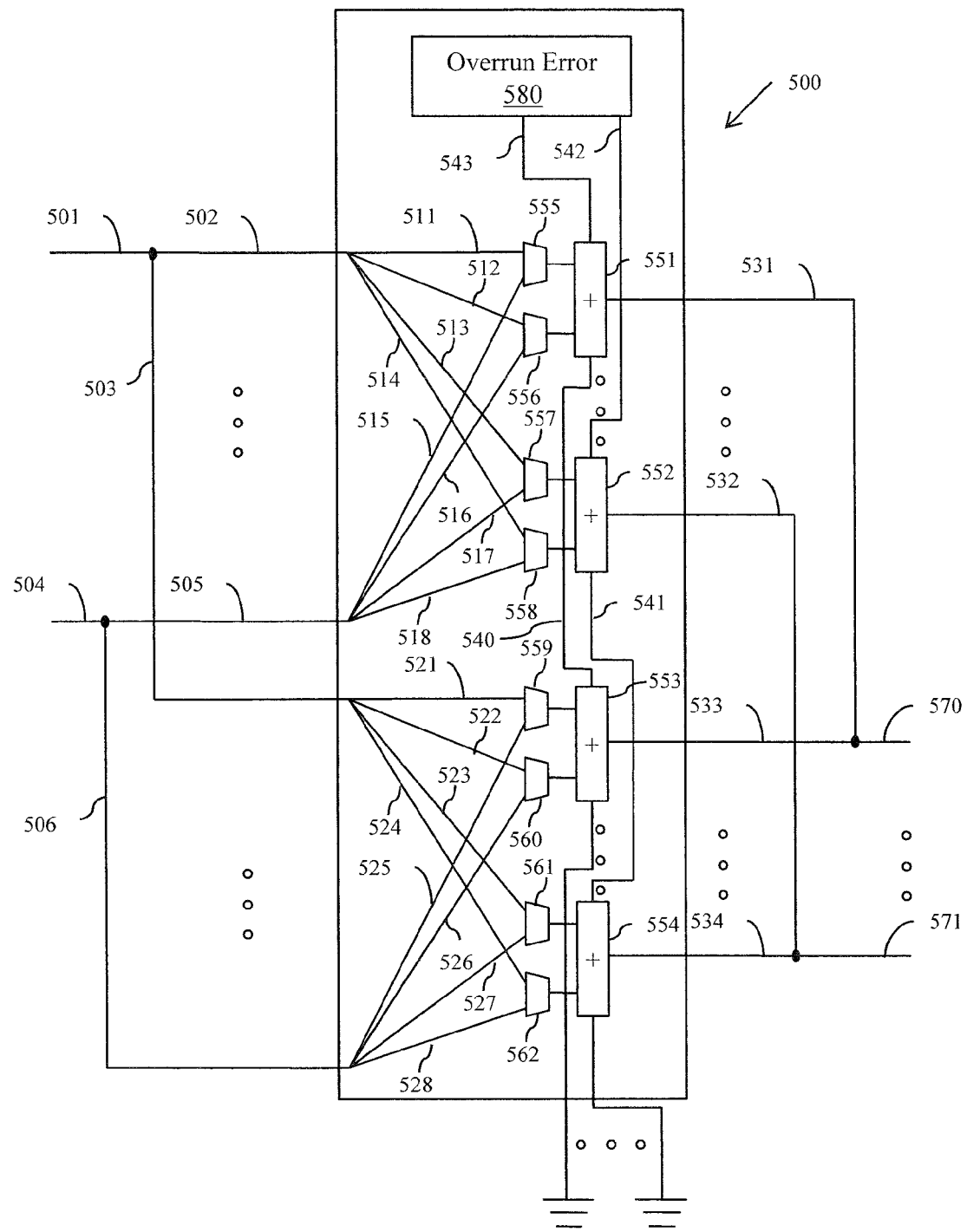
FIG. 5 illustrating an first exemplary embodiment of a second cross connect circuitry in accordance with this invention.

Each of the second set of cross connect 150-153 circuits includes connects between each connects intermediate path 144-147 and each connected PHY modules. This allows each of second set of cross connect circuits to split and combine signals on the intermediate paths 144-147 in a similar fashion to first set of cross connects circuits 140-143. An exemplary configuration of one of second set of cross connection circuits 150-153 is shown in FIG. 5 and described below.

The circuitry in combiner splitter circuitry is configured by processing system 160 to map the data between the proper RF module and the proper PHY module. Processing system 160 transmits signals to each of first set of cross connects 140-143 and each of second set of cross connects 150-153 to connects a data path 114-116 with the proper PHY module 120-123. Processing system 160 can statically program the circuits for a predetermined amount of time or configure combiner/splitter 130 on a per burst basis.

Figure 2:
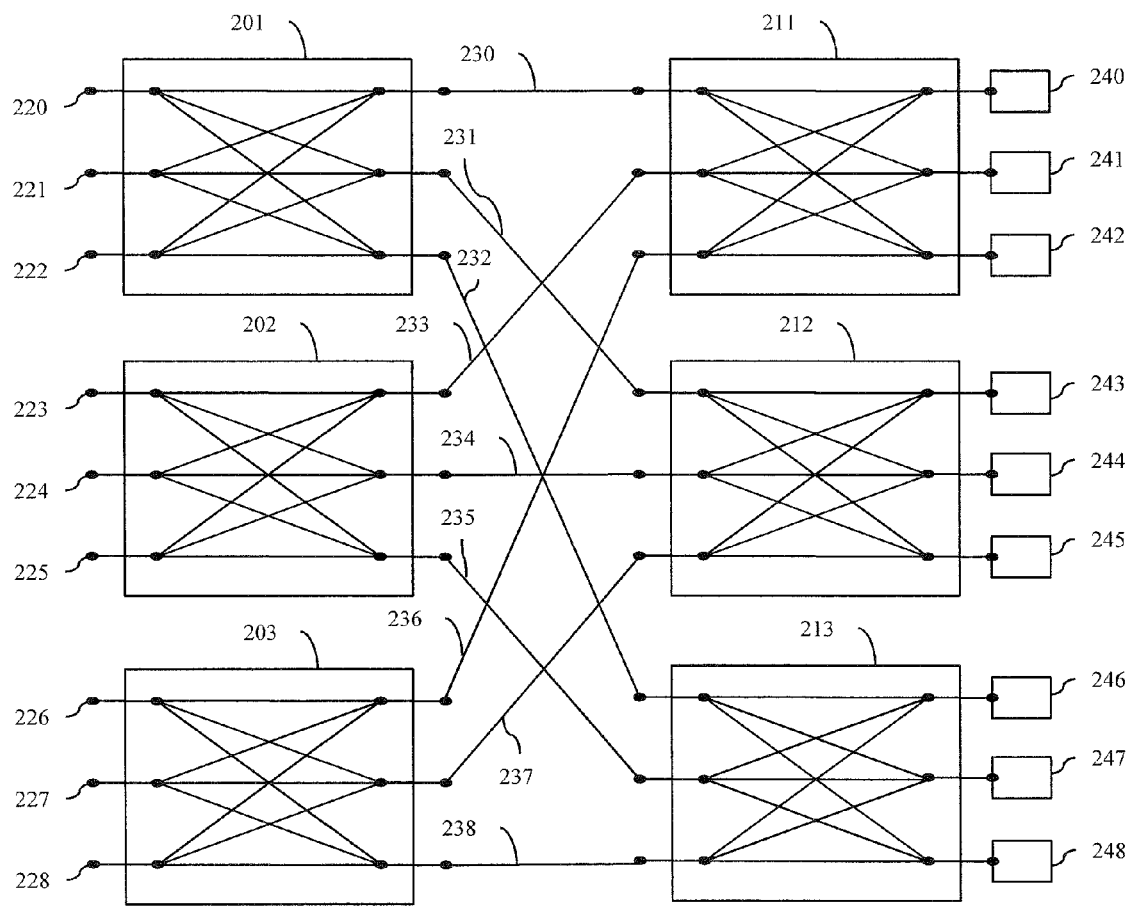
FIG. 2 illustrating circuitry for providing splitting and combining in accordance with this invention.

FIG. 2 illustrates an example of the hierarchal system of cross connections for providing a path from every data path of an RF module to each PHY module. For purposes of this example, only the RF modules are shown each providing 3 data paths. Thus, the must be 3 second cross connect circuits and 9 PHY modules in accordance with a preferred exemplary embodiment. Each first cross connect circuit 201-203 is connected to three data paths 220-222, 223-225, and 226-228 of an RF module (Not shown). Each first cross connect circuit is also connected to three intermediate paths 230-232, 233-235 and 236-238.

In each of the first set of cross connect circuits 201-203, there are connecting traces that connect each data path 220-222, 223-225, and 226-228 connected to the first cross connect circuit to every intermediate path 230-232, 233-235 and 236-238. For example, path 220 connects to paths 230, 231 and 232 in first cross connect circuit 201. Path 221 and path 222 also each connect to intermediate paths 230, 231, and 232.

The intermediate circuits 230-232, 233-235, and 236-238 connect each of the first set of cross connect circuits 201-203 with each of the second set of cross connect circuits. The intermediate paths are connected to the second set of cross connect circuits in the following manner. The first intermediate paths 230, 233 and 236 connect to the first of the second set of cross connect circuits 211. The second intermediate paths 231, 234, and 237 from each of the first set of cross connects connect to the second of the second set of cross connect circuits 212. The third intermediate paths 232, 235, and 238 from each of the first set of cross connects connect to the third of the second set of cross connect circuits 213. One skilled in the art will note that any data path 220-228 can be connected through first set of cross connect circuits 201-203 to any of second set of cross connect circuits 211-213 by connecting the data path to the proper intermediate path 230-238.

Each of second cross connect circuits 211-213 connects the connected intermediate paths 230-238 to each PHY module 240-248. For example, intermediate path 230, 233, and 236 connect to the first one of second set of cross connect circuit 211 which in turn connects each of the intermediate paths to each PHY module 240-242 connected to the cross connect circuit. Thus, by selecting the proper connects in the first and second set of cross connect circuits any data path 221-228 from any RF module may be connected to any of PHY modules 240-248.

Figure 3:
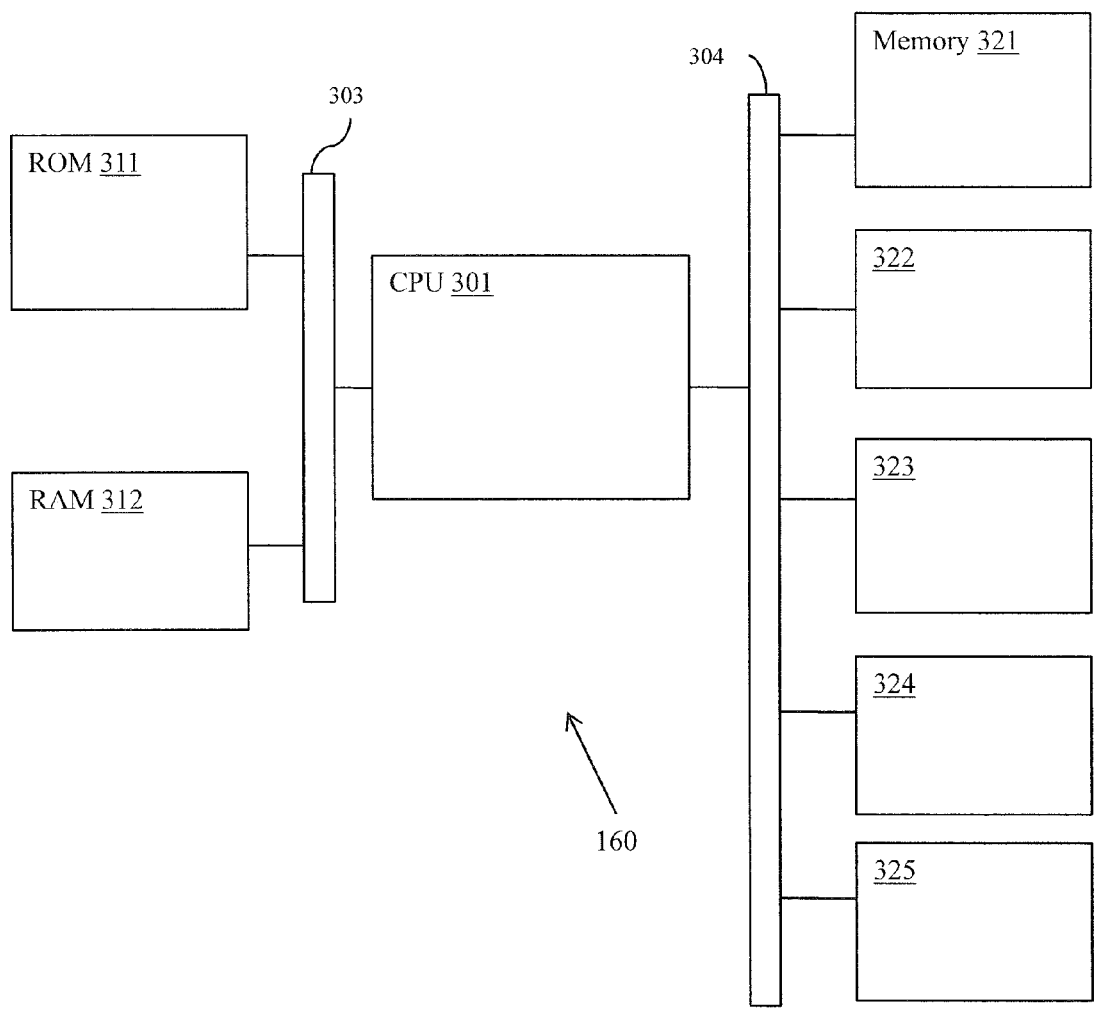
FIG. 3 illustrating a processing system in accordance with this invention.

As stated above, the switches in the first and second sets of cross connect circuits are configured by processing system 160 of FIG. 1. FIG. 3 illustrates the components of processing system 160. FIG. 3 illustrates a diagram of components of processing system 160. However, these are only exemplary components in processing system 160 and other devices and configurations may be used depending upon the functions that the processing device performs.

Processing system 160 has a Central Processing Unit (CPU) 301. CPU 301 is a processor, microprocessor, or any combination of processors and/or microprocessors that execute instructions stored in memory to perform an application. CPU 301 is connected to a memory bus 303 and Input/Output (I/O) bus 304.

A non-volatile memory such as Read Only Memory (ROM) 311 is connected to CPU 301 via memory bus 303. ROM 311 stores instructions for initialization and other systems command of processing system 160. One skilled in the art will recognize that any memory that cannot be written to by CPU 301 may be used for the functions of ROM 311.

A volatile memory such as Random Access Memory (RAM) 312 is also connected to CPU 301 via memory bus 304. RAM 312 stores instructions for all processes being executed and data operated upon by the executed processes. One skilled in the art will recognize that other types of memories such as DRAM and SRAM may also be used as a volatile memory and that memory caches and other memory devices (not shown) may be connected to memory bus 304.

Peripheral devices including, but not limited to, memory 321, I/O devices 322-324 that are connected to CPU 301 via I/O bus 304. I/O bus 304 carries data between each device and CPU 301. Memory 301 is a device for storing data unto a media. Some examples of memory 321 include read/write compact discs (CDs), and magnetic disk drives. I/O device 322 connects processing system 160 to splitter/combiner 130 (shown in FIG. 1). Each I/O device 323-325 connects to a path to a port of CMTS 100. One skilled in the art will recognize that processing system 100 will require an I/O device for each port in CMTS 100. One skilled in the art will recognize that exact configuration and devices connected to each processing system may vary depending upon the operations that the processing system performs.

FIG. 4 illustrates a diagram of components in each of the second set of cross connect circuits. Cross connect components connects to X number of data paths 401-407 and has X output ports 411-417 that connect to an intermediate path 421-427. Each path is connected to X internal paths 431-437 by switches 441-447. For purposes of clarity only the connections of the first data path 401 are shown and described. One skilled in the art will note that each data path 402-407 is connected to output ports 411-417 in a similar manner.

When a switch 441-447 is closed first path is connected to connected internal path. Any number of switches 441-447 may be closed at the same time to split the signals to more than one port 441. Furthermore, more than one data path 401-407 may be connected to an output port to combine the signal. One skilled in the art will recognize that there may be maximum number of paths that may be connected to one port. For example, only 4 data paths may be connected to an output in the preferred exemplary embodiment. One skilled in the art should be noted that the combining may be additive or muxed depending on the configuration.

Figure 6:
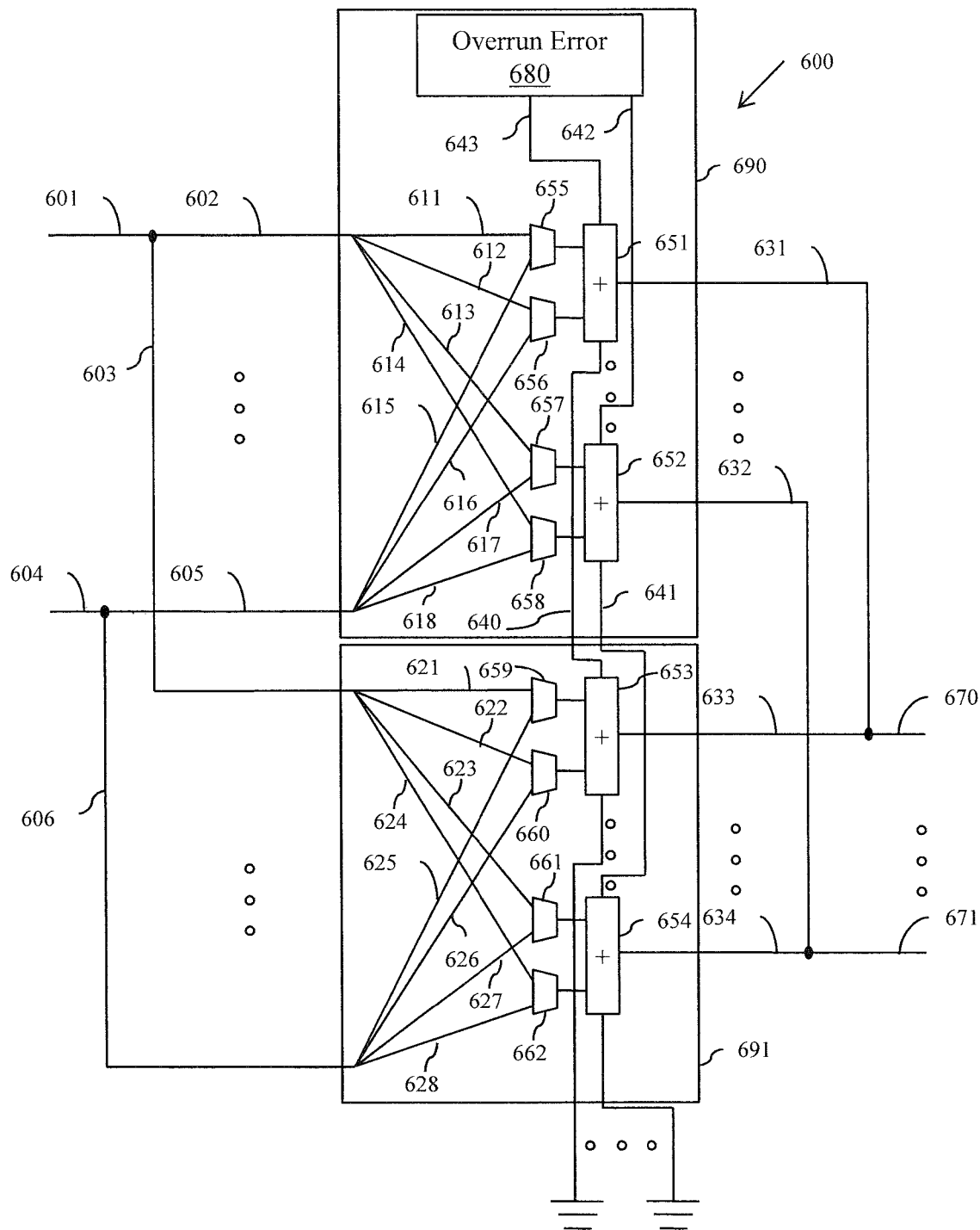
FIG. 6 illustrating a second exemplary embodiment of a second cross connect circuit in accordance with this invention.

FIGS. 5 and 6 illustrate alternative exemplary embodiments of the components for the second set of cross connecting circuits. In FIG. 5, a single circuit that connects the intermediate paths to PHY modules. In FIG. 6, multiple circuits are daisy-chained together to connect the intermediate paths to Phy modules.

Second slitter/combiner circuit 500 receives intermediate paths connected to each of the RF modules. Intermediate paths 501 connect data paths from the first RF module to splitter/combiner circuit 500. Intermediate paths 504 connect data paths from a Nth RF module to second combiner/splitter circuit 500. In the exemplary embodiment there are 12 groups of intermediate paths and there are 12 intermediate paths in each group of intermediate paths 501, 504.

Intermediate paths 501 are split into the upper most significant bit paths 502 and lowest significant bit paths 503. Second splitter combiner circuits includes 2*N adders 551-554. N adders 551-552 output the upper most significant bits of N output paths and N adders 553-554 output the lower most significant bits of the N output path. The two inputs of each adder are connected to a multiplexor 555-562.

The paths of uppermost bits from each group of intermediate paths are connected to each multiplexor connected to adders 551-552 that output the uppermost significant bits. In FIG. 5, uppermost bits paths 512-515 connect uppermost bits paths 502 from intermediate paths 503 to mutliplexors 555-558 and paths 515-518 connect uppermost bits paths 505 from intermediate paths 504 to mutliplexors 555-558. Multiplexors 555-558 are then controlled by the processing unit to select one group of connected uppermost bits paths to apply to an adder 551-552. The adders 551 then adds the two selected groups of uppermost bits to produce six outputs applied to path 531, 532 which in turn form the uppermost significant bits of output paths 570, 571.

The paths of lowermost bits from each group of intermediate paths are connected to each multiplexor connected to adders 553-554 that output the lowermost significant bits of output paths 560-561. In FIG. 5, lowermost bits paths 521-524 connect lowermost bits paths 503 from intermediate paths 501 to multiplexors 559-562 and lowermost bits paths 525-528 connect lowermost bits paths 506 from intermediate paths 503 to multiplexors 559-562. Multiplexors 559-562 are then controlled by the processing unit to select one group of connected uppermost bits paths to apply to an adder 553-554. The adders 553-554 then add the two selected groups of uppermost bits to produce six outputs applied to path 533, 534.

One skilled in the art will recognize that an adder may produce carry over bits. For example, in the exemplary embodiment, a six-bit adder produces an 8-bit output. Thus, the 2 carry-over bits from each lowermost significant bit adders 553-554 are carried by paths 540-541 to an uppermost significant bit adder 551-552 that provides the upper bits for a corresponding output. For example, path 540 connects lower significant bit adder 553 to upper significant bit adder 551. The carry over bits from upper significant bit adders are connected to an overflow register 580 via paths 542-543.

FIG. 6 illustrates an exemplary embodiment where two cross connect circuits are used in second cross connect circuit 600. This allows all of the adders in each chip to be used for either the upper most or lower most significant bit paths. Thus, twice as many inputs and outputs may be handled.

Second slitter/combiner circuit 600 receives intermediate paths connected to each of the RF modules. Intermediate paths 601 connect data paths from the first RF module to splitter/combiner circuit 600. Intermediate paths 604 connect data paths from a Nth RF module to second combiner/splitter circuit 600. In the exemplary embodiment there are 24 groups of intermediate paths and there are 12 intermediate paths in each group of intermediate paths 501, 504.

Intermediate paths 501,504 are split into the upper most significant bit paths 502 and lowest significant bit paths 503. First circuit 590 and second circuit 591 each includes N adders 651-654. In first chip 690, N adders 651-652 output the upper most significant bits of N output paths. In second chip 691, N adders 653-554 output the lower most significant bits of the N output paths. The two inputs of each adder 651-654 are connected to a multiplexor 555-562.

The paths of uppermost bits from each group of intermediate paths are connected to each multiplexor connected to adders 651-652 in first circuit 690 that output the uppermost significant bits. In FIG. 6, uppermost bits paths 612-615 in first circuit 690 connect uppermost bits paths 602 from intermediate paths 601 to multiplexors 655-658 and paths 615-618 connect uppermost bits paths 605 from intermediate paths 604 to multiplexors 655-658. Multiplexors 655-658 are then controlled by the processing unit to select one group of connected uppermost bits paths to apply to an adder 651-652. The adders 651 then adds the two selected groups of uppermost bits to produce six outputs applied to path 631, 632 which in turn form the uppermost significant bits of output paths 670, 671.

The paths of lowermost bits from each group of intermediate paths 601,604 are connected to each multiplexor connected to adders 653-654 in second circuit 691 that output the lowermost significant bits of output paths 670-671. In second circuit 691, lowermost bits paths 621-624 connect lowermost bits paths 603 from intermediate paths 601 to multiplexors 659-662 and lowermost bits paths 625-628 connect lowermost bits paths 606 from intermediate paths 603 to multiplexors 659-662. Multiplexors 659-662 are then controlled by the processing unit to select one group of connected uppermost bits paths to apply to an adder 653-654. The adders 653-654 then add the two selected groups of uppermost bits to produce six outputs applied to path 633, 634.

One skilled in the art will recognize that an adder may produce carry over bits. For example, in the exemplary embodiment, a six-bit adder produces an 8-bit output. Thus, the 2 carry-over bits from each lowermost significant bit adders 653-6554 in first circuit are carried by paths 640-641 to an uppermost significant bit adder 651-652 in first circuit 690 that provides the upper bits for a corresponding output. For example, path 640 connects lower significant bit adder 653 to upper significant bit adder 651. The carry over bits from upper significant bit adders are connected to an overflow register 680 via paths 642-643.

Figure 7:
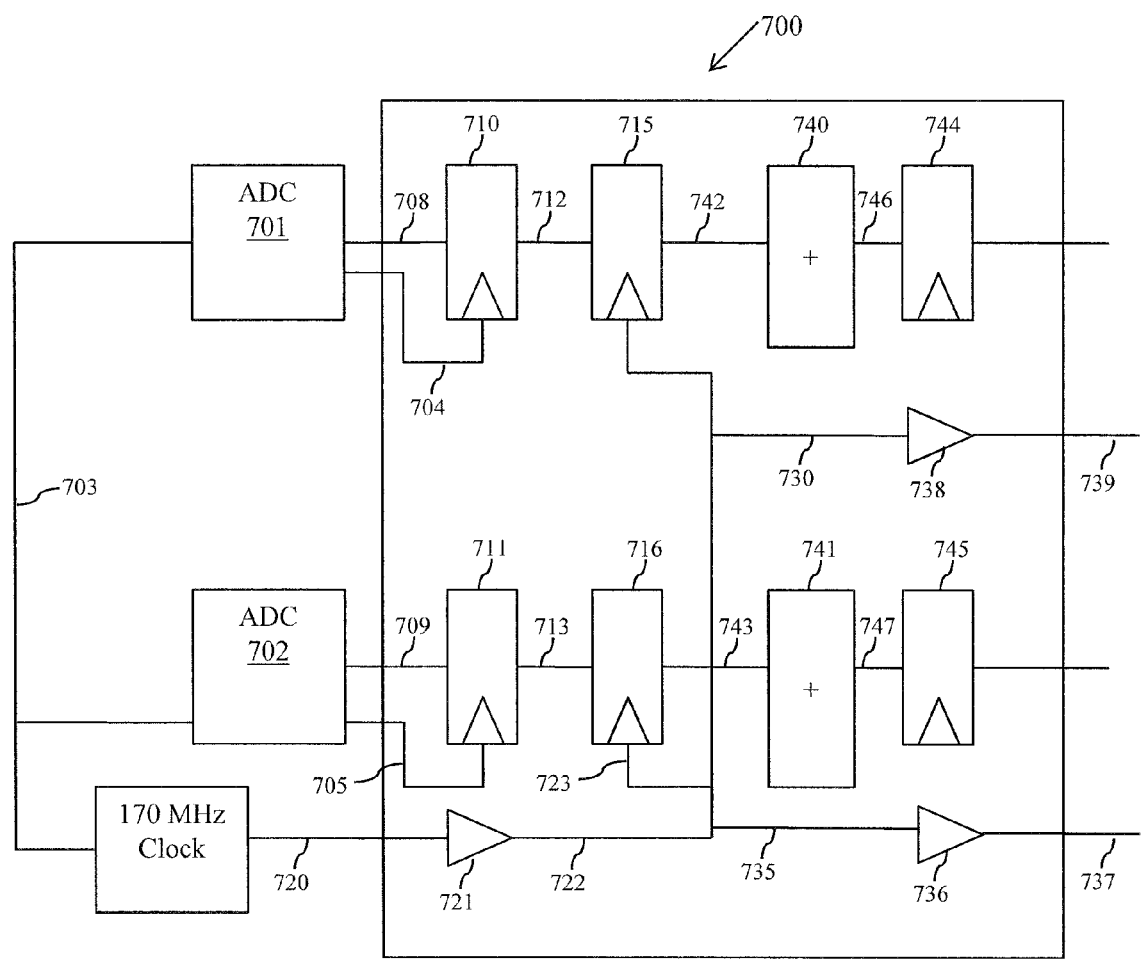
FIG. 7 illustrating an exemplary embodiment of timing circuit in accordance with this invention.

In order for a splitter/combiner in accordance with the present invention to function properly clock signals must be generated to drive the slitting and combining of data in an upstream configuration. FIG. 7 illustrates timing circuitry 700 that generates clock signals for the splitter/combiner circuitry in accordance with this invention.

In FIG. 7, each analog to digital converter 701-702 receives clock signals from a source clock over path 703. Each source clock that applies the clock signal to a path 704-705 that applies the clock signal to a flip-flop 710-711. Each flip-flop 710-711 receives the output paths 708-709 from A/D converters 701-702 and applies the output to paths 712 and 713.

The output paths 712-713 are each respectively applied to the input of a second flip-flip 715-716. Flip-flops 715-716 are driven by clock signals applied over paths 722 and 723 respectively. Path 722 is output from an inverter 721 that receives the global clock signal over path 720.

The outputs of flip-flops 715-716 are applied to adders 740 and 741 respectively over paths 742,743. The outputs of adders 740 and 741 are then each applied to flip-flops 744,745 over paths 746,747. The outputs of flip-flops 740,741 are then transmitted to the PHY modules.

Path 730 and 735 receive the clock signals over path 722 and apply the clock signals to an inverter 736, 738, the output of inverters 736, 738 are applied to paths 737 and 739 which connect to the PHY modules to supply the source clock to the PHY modules.

In the downstream direction clock signals are provided in the following manner. The second set of cross connect circuits mirror the 2× and 1× clock generation logic of the A/D converters. The second set of cross connect circuits have a programmable register that sets the phase relationship of the clock signals at one of 0, 90, 180, or 270. The second set of cross connect circuits drives the clock signals transmitted to the PHY modules.

One skilled in the art will recognize that the above are exemplary embodiments of a splitter combiner circuit in a CMTS. It is envisioned that one skilled in the art can and will design alternative embodiments that infringe on this invention as set forth in the claims below either literally or through the Doctrine of Equivalents.

What is claimed is:

1. An application specific integrated circuit (ASIC), comprising:
    a control logic to provide a control signal to control how a cable modem terminal system (CMTS) combines and splits signals received from radio frequency modules and physical interface modules;
    a multiplex logic to selectively combine at least two pre-multiplex signals into at least one post-multiplex signal based, at least in part, on the control signal, where a pre-multiplex signal is received from one of, a radio frequency module (RFM) in the CMTS and a physical interface module (PHYM) in the CMTS, and where a post-multiplex signal is provided to one of, a RFM in the CMTS and a PHYM in the CMTS; and
    a demultiplex logic to selectively split at least one pre-demultiplex signal into at least two post-demultiplex signals based, at least in part, on the control signal, where a pre-demultiplex signal is received from one of, a RFM in the CMTS and a PHYM in the CMTS, and where a post-demultiplex signal is provided to one of, a RFM in the CMTS and a PHYM in the CMTS;
    where the multiplex logic operates in one of, a static multiplexing mode and a dynamic multiplexing mode;
    where the control logic controls the multiplex logic to dynamically change the at least two pre-multiplex signals to selectively combine on a per burst basis in the dynamic multiplexing mode.

2. The ASIC of claim 1, where the static multiplexing mode supports summation.

3. The ASIC of claim 1, where the pre-multiplex signals and the pre-demultiplex signals are provided by a set of N input lines, N being a positive integer.

4. The ASIC of claim 3, where N is 24.

5. The ASIC of claim 1, where the post-multiplex and the post-demultiplex signals are provided to a set of M output lines, M being a positive integer.

6. The ASIC of claim 5, where M is 24.

7. An application specific integrated circuit (ASIC), comprising:
    one or more Radio Frequency (RF) cross connects, comprising:
        a set of RF external connectors configured to connect to a set of RF modules, and
        a set of RF internal connectors,
        where members of the set of RF external connectors are configured to provide a signal to one or more members of the set of RF internal connectors,
        where the one or more members of the set of RF internal connectors are configured to provide a signal to one or more members of the set of RF external connectors,
        where the one or more RF cross connects are configured to split signals received on members of the set of RF internal connectors from an intermediate connector and provide a split signal to members of the set of RF external connectors, and
        where the one or more RF cross connects are configured to receive one or more signals on a member of the RF internal connectors from one or more RF external connectors and provide a combined signal to an intermediate connector;
    one or more Physical Layer (PHY) cross connects, comprising:
        a set of PHY internal connectors, and
        a set of PHY external connectors configured to connect to a set of PHY modules and, where the members of the set of PHY external connectors are connected to the members of the set of PHY internal connectors,
        where the members of the set of PHY external connectors are configured to provide a signal to one or more members of the set of PHY internal connectors,
        where the one or more members of the set of PHY internal connectors are configured to provide a signal to one or more members of the set of PHY external connectors,
        where the set of PHY internal connectors are configured to connect to an intermediate connector,
        where the one or more PHY cross connects are configured to split signals received on members of the set of PHY external connectors from a PHY module and provide a split signal to members of the set of PHY internal connectors, and
        where the one or more PHY cross connects are configured to receive one or more signals on a member of the PHY external connectors from one or more members of the set of PHY internal connectors and provide a combined signal to a PHY module;
    where sets of RF internal connectors and sets of PHY internal connectors connect the one or more RF cross connects to the one or more PHY cross connects through an intermediate connect;
    where the intermediate connect comprises a plurality of connectors; and
    a control logic configured to control the one or more PHY cross connects and the one or more RF cross connects to dynamically change connections in the one or more PHY cross connects and the one or more RF cross connects to provide connections between a plurality of RF modules and a plurality of PHY modules, where the control logic dynamically changes connections based, at least in part, on a per burst cycle.

8. The ASIC of claim 7, where the control logic dynamically changes connections based, at least in part, on a predetermined amount of time.

9. The ASIC of claim 7, where the control logic is configured to select upper bits and lower bits from a first signal and upper bits and lower bits from a second signal to combine in a set of adders in one of, the one or more RF cross connects and the one or more PHY cross connects.

* * * * *

UNITED STATES PATENT AND TRADEMARK OFFICE
CERTIFICATE OF CORRECTION

PATENT NO.        : 7,657,915 B1
APPLICATION NO.   : 10/871884
DATED             : February 2, 2010
INVENTOR(S)       : Bradley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1446 days.

Signed and Sealed this

Twenty-eighth Day of December, 2010

David J. Kappos
*Director of the United States Patent and Trademark Office*